United States Patent
Brody et al.

(10) Patent No.: US 8,341,542 B2
(45) Date of Patent: *Dec. 25, 2012

(54) METHOD AND APPARATUS FOR USER CUSTOMIZED SHADING OF A GRAPHICAL USER INTERFACE

(75) Inventors: Sarah Brody, San Jose, CA (US); Tim Wasko, High River (CA); Robert Kondrk, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 729 days.

This patent is subject to a terminal disclaimer.

(21) Appl. No.: 11/625,806

(22) Filed: Jan. 22, 2007

(65) Prior Publication Data

US 2007/0115285 A1 May 24, 2007

Related U.S. Application Data

(63) Continuation of application No. 10/301,500, filed on Nov. 20, 2002, now Pat. No. 7,184,056.

(51) Int. Cl.
*G06F 3/048* (2006.01)

(52) U.S. Cl. ........ 715/784; 715/722; 715/810; 715/833; 715/835

(58) Field of Classification Search .......... 715/784
See application file for complete search history.

(56) References Cited

U.S. PATENT DOCUMENTS

| | | |
|---|---|---|
| 5,721,851 A | 2/1998 | Chine et al. |
| 6,081,254 A | 6/2000 | Tanaka et al. |
| 6,177,945 B1 | 1/2001 | Pleyer |
| 6,191,790 B1 | 2/2001 | Bogdan |
| 6,222,540 B1 * | 4/2001 | Sacerdoti .................. 345/581 |
| 6,262,817 B1 * | 7/2001 | Sato et al. .................. 358/518 |
| 6,348,936 B1 * | 2/2002 | Berteig .................. 715/856 |
| 6,429,885 B1 * | 8/2002 | Saib et al. .................. 715/854 |
| 6,850,259 B1 | 2/2005 | Rzepkowski et al. |
| 7,079,711 B2 * | 7/2006 | Labelle .................. 382/305 |

(Continued)

FOREIGN PATENT DOCUMENTS

EP     0757309 A     2/1997

(Continued)

OTHER PUBLICATIONS

Non-Final Office Action of U.S. Appl. No. 10/301,500, Oct. 26, 2004 (mailing date), Brody, et al.

(Continued)

*Primary Examiner* — Doon Chow
*Assistant Examiner* — Anil Kumar
(74) *Attorney, Agent, or Firm* — Schwegman Lundberg & Woessner, P.A.

(57) ABSTRACT

To allow users to compensate for different and dynamically changing lighting conditions, the present invention introduces a graphical user interface shading system. The graphical user interface shading system provides a very simple intuitive interface to the user. In one embodiment, the user is presented with an adjustable user interface widget such as a slider that allows the user to select any shading setting along a shading continuum. The graphical user interface shading system reacts to the users control by adjusting a number of different graphical user interface elements in response to the new shading setting. In one embodiment, the graphical user interface shading system adjusts singled colored areas with a linear interpolation, text with a font color selection, icons with an icon bitmap selection, textured areas with a texture blend, and decals with a decal blend.

23 Claims, 7 Drawing Sheets

U.S. PATENT DOCUMENTS

| | | | |
|---|---|---|---|
| 7,092,122 | B2 | 8/2006 | Iwaki |
| 7,095,434 | B1 | 8/2006 | Ikeda |
| 7,184,056 | B2 | 2/2007 | Brody et al. |
| 7,236,154 | B1 | 6/2007 | Kerr et al. |
| 2001/0036310 | A1* | 11/2001 | Pettigrew et al. ............. 382/167 |
| 2002/0152222 | A1* | 10/2002 | Holbrook ................... 707/104.1 |
| 2003/0007011 | A1* | 1/2003 | Zimmerman et al. ........ 345/810 |
| 2003/0021488 | A1 | 1/2003 | Shaw et al. |
| 2003/0038832 | A1* | 2/2003 | Sobol ........................... 345/722 |
| 2003/0142138 | A1 | 7/2003 | Brown et al. |
| 2003/0142140 | A1 | 7/2003 | Brown et al. |
| 2003/0151611 | A1* | 8/2003 | Turpin et al. .................. 345/589 |
| 2004/0008208 | A1* | 1/2004 | Dresevic et al. ............. 345/589 |
| 2005/0212824 | A1 | 9/2005 | Marcinkiewicz et al. |
| 2006/0284895 | A1 | 12/2006 | Marcu et al. |
| 2011/0035552 | A1 | 2/2011 | Heynen et al. |

FOREIGN PATENT DOCUMENTS

| | | |
|---|---|---|
| JP | 9044335 A | 2/1997 |
| WO | WO2004/046906 | 6/2004 |

OTHER PUBLICATIONS

Final Office Action of U.S. Appl. No. 10/301,500, Jun. 9, 2005 (mailing date), Brody, et al.

Non-Final Office Action of U.S. Appl. No. 10/301,500, Feb. 10, 2006 (mailing date), Brody, et al.

Notice of Allowance of U.S. Appl. No. 10/301,500, Oct. 6, 2006 (mailing date), Brody, et al.

Notice of Allowance of U.S. Appl. No. 10/301,500, Oct. 30, 2006 (mailing date), Brody, et al.

International Search Report of PCT/US2003/038026, May 25, 2005 (mailing date), Apple Computer Inc.

International Preliminary Examination Report of PCT/US2003/038026, Dec. 21, 2006 (mailing date), Apple Computer Inc.

Screenshots #1-13 of Microsoft Windows NT 4.0. Microsoft Corporation, Copyright 1981-1998. Released, Aug. 1996. Screenshots created Oct. 13, 2004.

U.S. Appl. No. 12/536,478, filed Aug. 5, 2009, Heynen, Patrick, et al.

Updated portions of prosecution history of U.S. Appl. No. 10/301,500, Jul. 10, 2006, Brody, Sarah, et al.

EP Office Action of EP03790154.3, Dec. 4, 2009, Apple Computer, Inc.

EP Office Action of EP03790154.3, Jul. 12, 2006, Apple Computer, Inc.

Updated portions of prosecution history of European Patent Application EP03790154, May 26, 2010 (mailing date), Apple Inc.

Portions of prosecution history of U.S. Appl. No. 12/536,478, Jun. 4, 2012, Heynen, Patrick et al.

* cited by examiner

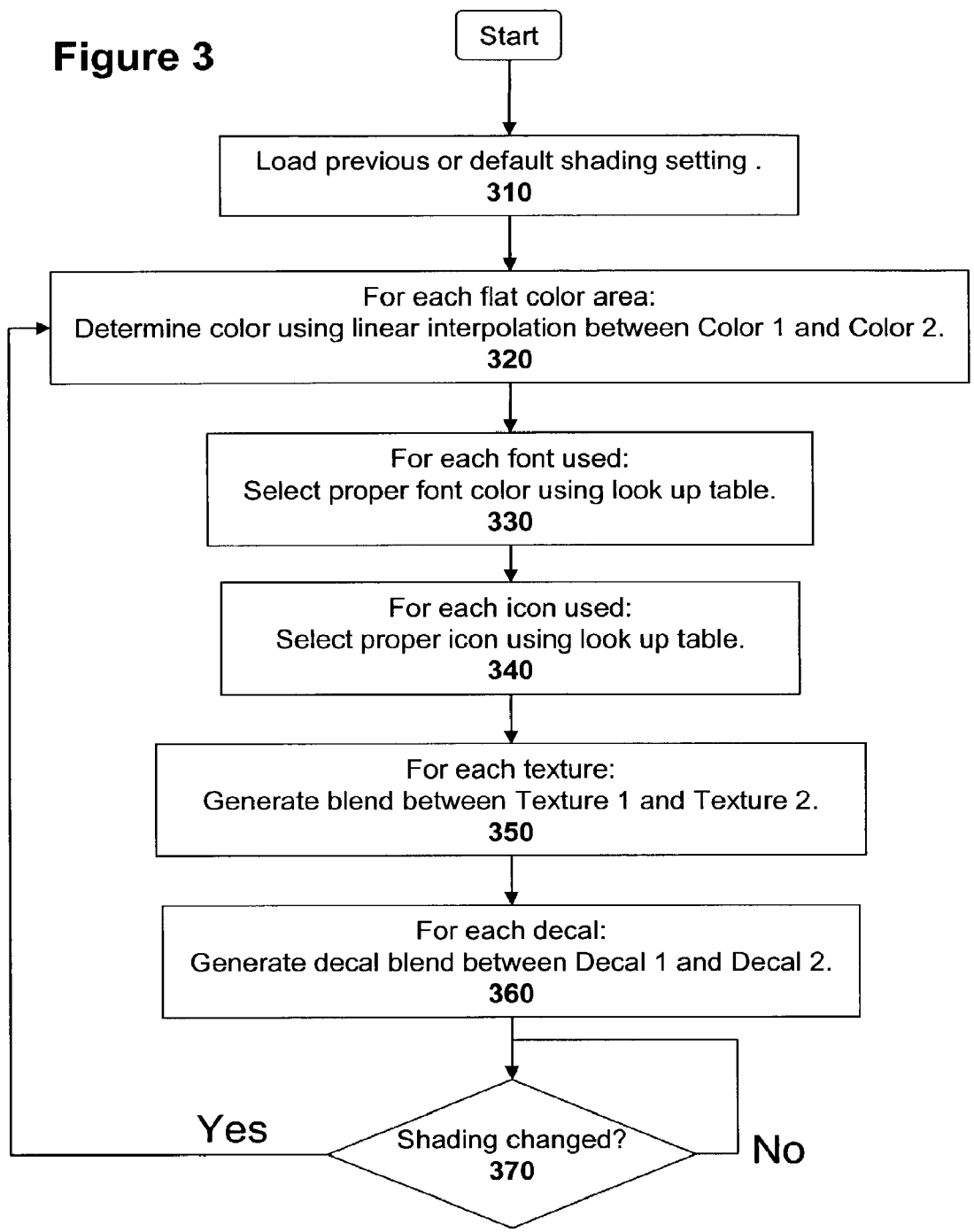

METHOD AND APPARATUS FOR USER CUSTOMIZED SHADING OF A GRAPHICAL USER INTERFACE

CLAIM OF BENEFIT TO PRIOR APPLICATION

This application is a continuation application of U.S. patent application Ser. No. 10/301,500, filed Nov. 20, 2002 now U.S. Pat. No. 7,184,056, which is incorporated herein by reference.

FIELD OF THE INVENTION

The present invention relates to the field of human to computer interface systems. In particular the present invention discloses highly customizable graphical user interface shading system.

BACKGROUND OF THE INVENTION

Since the 1980's graphical user interfaces have become the primary interface between users and computer systems. Graphical user interfaces present information to computer users in a simple and intuitive manner. For example, most current word processors employ a main window with What-You-See-Is-What-You-Get (WYSIWYG) display of the document and a set of graphical tool icons displayed on a tool bar for editing the document.

Many users wish to alter a graphical user interface to adapt the graphical user interface to their particular personal preferences. To implement such personalization, many graphical user interface systems allow a user to select color schemes, alter the appearance of the graphical user interface icons, modify the contents of the pull-down menus, and adjust the tools that available on a particular toolbar.

Although some graphical user interface systems allow users to customize some aspects of the graphical user interface, the amount of customization allowed is limited and the customization that is available is not very intuitive. In fact, some operating systems provide such limited customization that is difficult to use that a user is forced to purchase an add-on extra product if better customization is desired. Even with the add-on pack, the user is forced to select from a set of pre-defined graphical user interface settings. Thus, it would be desirable to provide users with a more flexible and easier to use graphical user interface customization tool.

SUMMARY OF THE INVENTION

To allow users to compensate for different and dynamically changing lighting conditions, the present invention introduces a graphical user interface shading system. The graphical user interface shading system provides a very simple intuitive interface to the user. In one embodiment, the user is presented with an adjustable user interface widget such as a slider that allows the user to select any shading setting along a shading continuum. The graphical user interface shading system reacts to the users control by adjusting a number of different graphical user interface elements in response to the new shading setting. In one embodiment, the graphical user interface shading system adjusts singled colored areas with a linear interpolation between two colors provided. Text areas are handled by selecting a font color dependent on the shading setting. Icons are handled by selecting a particular icon bitmap dependent on the shading setting. The shading system handles textured areas by creating a weighted texture blend between two textures using the shading setting to select the weighting. Finally, decals in the user interface are handled by creating a blend between two decals.

Other objects, features, and advantages of the present invention will be apparent from the accompanying drawings and from the following detailed description.

BRIEF DESCRIPTION OF THE DRAWINGS

The objects, features, and advantages of the present invention will be apparent to one skilled in the art, in view of the following detailed description in which:

FIG. 3 illustrates a flow diagram that describes how one embodiment of the graphical user interface shading system may operate.

DETAILED DESCRIPTION OF THE PREFERRED EMBODIMENT

Figure 1A:
FIG. 1A illustrates a first view of a user interface adjustment window for adjusting the shading of a graphical user interface and a graphical user interface that is having its shading adjusted.

A method and apparatus for a user customized graphical user interface shading is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the Macintosh Operating Systems (MacOS). However, the techniques and teachings of the present invention can easily be applied to other operating systems or any system that presents a graphical user interface.

Graphical User Interfaces in Various Environments

Computer systems are being used in just about every area of modern life these days. Thus, computers are now used in many different environments: offices, darkened studios, retail stores, malls, airports, stadiums, subways, cars, and even outdoors. All of these different environments present very different lighting conditions. Offices may have fluorescent lighting, darkened studios may have low lighting, and outdoor settings may have strong sunlight.

Beyond the very different possible lighting conditions for computer operation, the lighting conditions at any particular location may vary over time. For example, as the sun moves across the sky, the lighting in a room with a window will vary significantly. Furthermore, clouds may move in and obscure the sun, the sun will eventually set at night, and doors and windows may be opened or closed thus allowing or blocking sunlight, respectively.

With such varied lighting conditions and dynamically changing light conditions, it would be desirable to provide users with a simple and effective manner of adjusting the display of a graphical user interface to best adapt to the current lighting conditions. To provide such functionality, the present invention introduces an intuitive adjustable graphical user interface shading system. The adjustable graphical user interface shading system allows a user to adjust the shading of the graphical user interface along a continuum to select a personal preference.

Graphical User Interface Shading System Overview

To allow users to compensate for different lighting conditions, some graphical user interface systems allow the user to change the colors used to render the graphical user interface. However, such simple customization systems fall short of providing a satisfactory means to allow a user to adjust the graphical user interface in response to different lighting conditions.

The present invention introduces a sophisticated graphical user interface shading system that provides a very simple intuitive interface to the user. In the system of the present invention, the user is presented with an adjustable user interface widget that allows the user to select any location along a shading continuum. In one embodiment, the shading continuum varies from a very dark background with light colored text and icons to a very light background with dark colored text and icons.

In one embodiment the graphical user interface shading system of the present invention, the adjustable user interface widget is a slider bar that allows the user to slide an indicator along a defined range. However, other adjustable user interface widgets may also be employed. For example, the radio-dial knob, a digital display with up and down adjustment buttons, or any other adjustable user interface widget that allows a user to select a value within a define range may be used.

Graphical User Interface Shading System Details

To describe the graphical user interface shading system of the present invention, one particular implementation will be described with reference to FIGS. 1A to 3. However, it should be noted that specific implementation details selected in the disclosed implementation are not required to practice the teachings of the present invention.

FIG. 1A illustrates an example embodiment of a graphical user interface employing the graphical user interface shading system of the present invention. The left side of FIG. 1A illustrates a user interface adjustment window 111 that contains a slider bar 121. As illustrated in FIG. 1A, an indicator on the slider bar 121 is set to the left most position for a zero ("0") shading setting value as indicated by amount indicator 119. The indicator on the slider bar 121 may be adjusted to the right to change the shading setting of the graphical user interface. When the indicator on the slider bar 121 is adjusted all the way to the right of the slider bar 121 then the shading setting in the amount indicator 119 will display "100".

Figure 2:
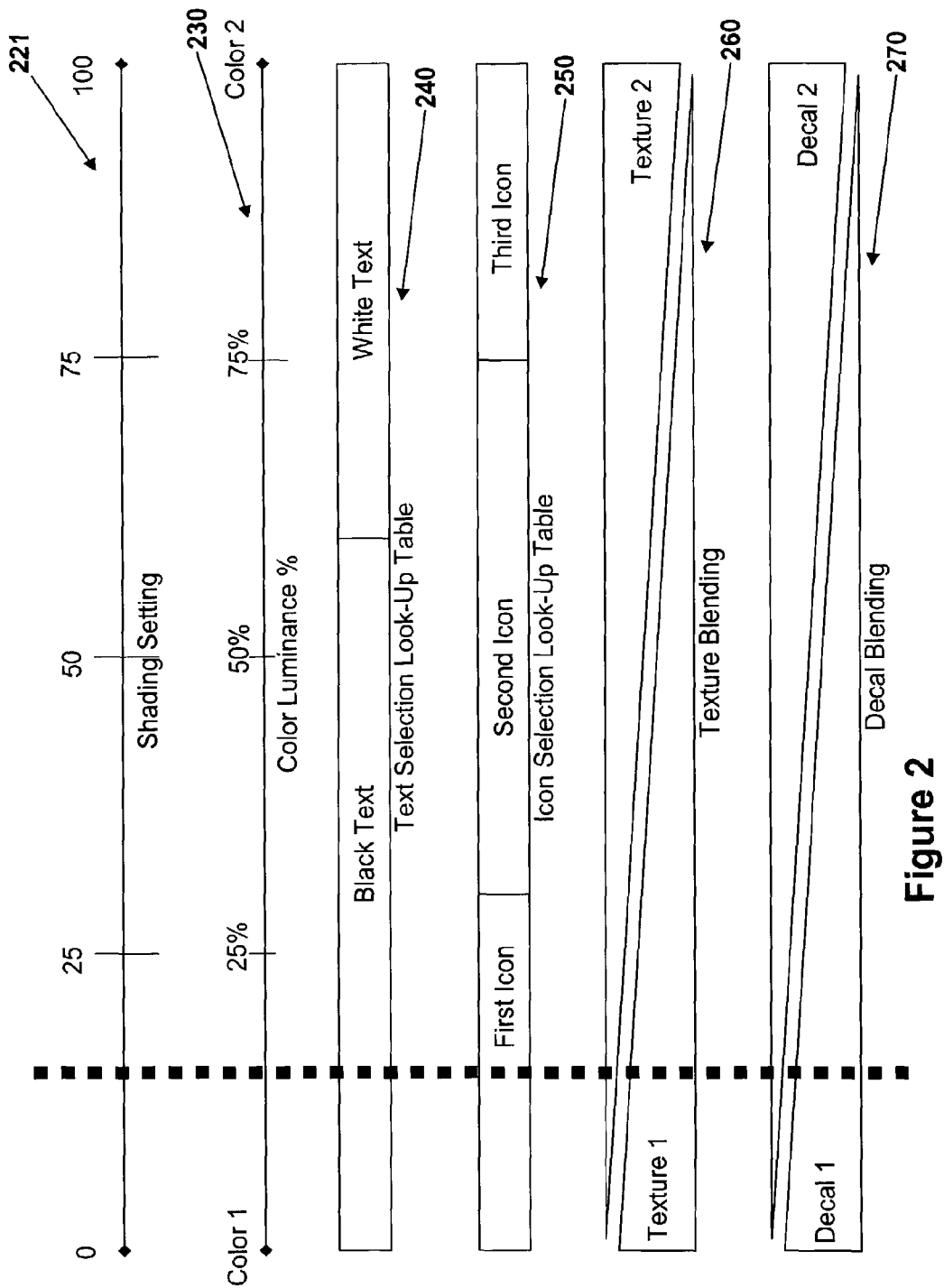
FIG. 2 illustrates a conceptual diagram that describes how the graphical user interface shading system handles the shading of various different user interface elements.

Below slider bar 121 and amount indicator 119 is a save button 128. Save button 128 allows the user to save the current shading setting. In the embodiment of FIG. 2, the user may save the current shading setting into any of the four custom shading setting buttons that are below save button 128. The saved shading setting may be recalled by pressing the associated custom shading setting button.

The right side of FIG. 1A illustrates an application window 139 containing the graphical user interface for a video editing program. The shading of the video editing program graphical user interface is controlled using the slider bar 121 in the user interface adjustment window 111. The application window 139 contains many different user interface elements that are displayed to the user. Each of these different user interface elements must be adjusted by the shading system to present a consistent graphical user interface shading experience to the user. Each user interface element will be discussed in detail.

Flat Single Color Areas of the Graphical User Interface

Large areas of the graphical user interface for an application are filled with a single flat background color. For example, area 131 of FIG. 1A is filled with a solid background color that acts as the background for a list of file names. The graphical user interface shading system of the present invention handles flat areas by having the application programmer supply two different pixel color values that represent the two color extremes (color 1 and color 2) for the two extremes of the shading system (setting 0 and setting 100, respectively). The graphical user interface shading system then selects a color for the area by determining a linear interpolation between the two colors.

FIG. 2 illustrates a conceptual diagram that describes how the graphical user interface shading system of the present invention handles different user interface elements. FIG. 2 illustrates a shading slider 221 that is a representation of the shading slider 121 of FIG. 1A. Below the shading slider 221 of FIG. 2 is a color luminance scale 230 aligned with the shading slider 221 that has color 1 on the left and color 2 on the right. In one embodiment, color 1 and color 2 have the same hue (H) and saturation (S) but only differ by their luminance value (V). In such an embodiment, the system reads the shading setting and determines a linear interpolation between the two color values (color 1 and color 2). For example, FIG. 2 illustrates a dotted line that represents a shading setting of 15. With such a shading setting, the graphical user interface shading system of the present invention determines a color with a luminance value that is 15% between the luminance of color 1 and the luminance of color 2.

Text Sections of the Graphical User Interface

Even graphical user interfaces contain significant amounts of alphanumeric text material. Thus, the graphical user interface shading system of the present invention must handle shading adjustments of such alphanumeric text. To handle text, the graphical user interface shading system uses the shading setting to select a font color to use.

FIG. 2 illustrates a conceptual diagram of a text color selection look-up table 240. The text color selection look-up table specifies what color of text should be used for a particular shading setting. In the embodiment of FIG. 2, black text is used up until the "60" shading setting. For higher shading settings, white colored text is used. Ideally, the text color look-up table should be created in concert with the various background area colors such that adequate contrast between the text and the background color is maintained for all shading settings.

The embodiment illustrated in FIG. 2 uses only black text for a certain range of the shading setting and then white text for the remainder of shading settings. However, there is no limitation to just having two font colors.

Graphical User Interface Icons

Most graphical user interfaces also contain simple icons that users may view and interact with in addition to text. For example, FIG. 1A illustrates application window 139 that contains clock icon 151.

The graphical user interface shading system of the present invention handles the shading adjustments of simple icons in a manner similar to the system for handling text. Specifically, the graphical user interface designer creates a set of different icons for different shading ranges. The graphical user interface designer then specifies a shading range that defines when each icon will be used.

FIG. 2 illustrates an icon selection look-up table 250 for selecting a particular icon representation that will be used to drawing the icon. In the embodiment of FIG. 2, a first icon is used from shading range 0 to 30, a second icon is used from 30 to 75, and a third icon is used from 75 to 100. However, the shading setting continuum may be divided into any number of different ranges with each range having an associated icon representation that should be used within that range.

Textured Areas of the Graphical User Interface

Instead of simply using a single color, some areas of user interfaces use 'textures' to provide a more life-like appearance. A texture is a two-dimensional bit-mapped image that may be used to cover any surface. For example, area 161 in FIG. 1A is rendered with a texture.

The graphical user interface shading system of the present invention handles textures by having the graphical user interface define two different textures for the two shading settings extremes. Specifically, the graphical user interface designer submits a first texture (texture 1) for the 0 shading setting and a second texture (texture 2) for the 100 shading setting. The graphical user interface shading system then generates a weighted blend of the two textures depending on the shading setting. The weighted blend varies from 100% texture 1 at shading setting 0 to 100% texture 2 at shading setting 100. FIG. 2 conceptually illustrates the system with texture blend diagram 260.

User Interface Decals

Certain user interface devices are more complex than simple icons. To render more complex user interface devices, a graphical user interface may use 'decals'. A decal is a small two-dimensional object that may be rendered on the screen. For example, user interface device 171 in FIG. 1A is rendered with a decal.

The graphical user interface shading system of the present invention handles decals in the same manner that textures are handled. Specifically, the graphical user interface designer creates a first decal (decal 1) for the 0 shading setting and a second decal (decal 2) for the 100 shading setting. The graphical user interface shading system then generates a weighted blend of the two decals depending on the shading setting. The weighted blend varies from 100% decal 1 at shading setting 0 to 100% decal 2 at shading setting 100. FIG. 2 conceptually illustrates the decal blending system with decal blend diagram 270.

Graphical Shading System Implementation

FIG. 3 illustrates a flow diagram that describes how one embodiment of the graphical user interface shading system may operate. Referring to FIG. 3, when the application first begins execution, the shading system loads the previous shading setting or a default shading setting (depending on the implementation) at step 310. In the embodiment described with reference to FIGS. 1A to 2, the shading setting may be a value from 0 to 100.

Next, at step 320, the shading system determines the colors that will be used in areas filled in with a flat single color. As set forth in step 320, the shading system selects a linear interpolation between the two colors defined for each area (color 1 and color 2). In a preferred embodiment, the interpolation is only along a luminance difference between color 1 and color 2. The interpolated color for each area will be used to fill in the background for that area.

At step 330, the shading system addresses text elements. For each font used, the shading system uses the shading setting as an index into a look-up table associated with that font to determine what color will be used to render the font on the screen. Note that different fonts may use different look up tables or all the fonts may use the same look-up table.

Next, at step 340, the shading system handles icons. For each icon that is used in the graphical user interface, the shading system uses the shading setting as an index into a look-up table associated with the icon to determine which bitmap will be used to render the icon on the screen.

Then, at step 350, the shading system creates a set of textures to use for the textured areas of the graphical user interface. For each different texture, the shading system creates a weighted texture blend using the two textures provided by the graphical user interface designer. The blended texture will be used in the associated textured areas of the graphical user interface.

Finally, at step 360, the shading system creates a set of decals to represent user interface objects. For each decal in the graphical user interface, the shading system creates a weighted decal blend using the two decals (decal 1 and decal 2) provided by the graphical user interface designer for the two shading extremes. The graphical user interface is then rendered using the blended decal.

After step 360, the application program runs normally using the background colors, font colors, icons, blended textures, and blended decals created for that particular shading setting. However, if the shading system determines (at step 370) that the shading setting has changed, then the shading system returns to step 320 to create a new set of background colors, font colors, icons, blended textures, and blended decals created for the new shading setting.

Graphical User Interface Shading System Example

To illustrate how the graphical user interface shading system operates in an actual application, FIGS. 1A to 1E illustrate how the appearance of an example graphical user interface change as the shading setting value is moved from 0 to 100 in four increments of 25.

Initially, in FIG. 1A, the graphical user interface of the application window 139 features black text 141 on light backgrounds 131. The icons, such as icon 151, are also black like the text. The textured areas, such as texture 161, are light colored like the single colored background area 131. Finally, the decals such as decal 171 are also relatively light.

Figure 1B:
FIG. 1B illustrates a second view of a user interface adjustment window for adjusting the shading of a graphical user interface and a graphical user interface that is having its shading adjusted.

When a user moves the indicator on the shading slider 121 to the right to the '25' shading setting, the graphical user interface of the application window will appear as shown in FIG. 1B. Note that in FIG. 1B, the text 142 and the icons 152 are still black. However, the single colored background 132, texture 162, and decal 172 have become darker.

Figure 1C:
FIG. 1C illustrates a third view of a user interface adjustment window for adjusting the shading of a graphical user interface and a graphical user interface that is having its shading adjusted.

When a user moves the indicator on the shading slider of FIG. 1B even further to the right, to the '50' shading setting, the graphical user interface of the application window will appear as shown in FIG. 1C. Again, note that in FIG. 1C, the text 143 and the icons 153 are still black. However, the single colored background 133, texture 163, and decal 173 have become even darker due to the blending.

Figure 1D:
FIG. 1D illustrates a fourth view of a user interface adjustment window for adjusting the shading of a graphical user interface and a graphical user interface that is having its shading adjusted.

When a user moves the indicator on the shading slider of FIG. 1C even further to the right, to the '75' shading setting, the graphical user interface of the application window will appear as shown in FIG. 1D. In FIG. 1D, the single colored background 134, texture 164, and decal 174 have become yet even darker due to the blending. However, in FIG. 1D, the text 144 and the icons 154 are now rendered in white to provide greater contrast with the darkened background.

Figure 1E:
FIG. 1E illustrates a fifth view of a user interface adjustment window for adjusting the shading of a graphical user interface and a graphical user interface that is having its shading adjusted.

Finally, when a user moves the indicator on the shading slider of FIG. 1D completely to the right-hand side to the '100' shading setting, the graphical user interface of the application window will appear as shown in FIG. 1E. As was illustrated in FIG. 1D, the text 145 and the icons 155 are rendered in white to contrast with the very dark background areas. Specifically, the single colored background 135, texture 165, and decal 175 have become very dark since the dark color 2, the dark texture 2, and dark decal 2 are used, respectively.

The foregoing has described a graphical user interface shading system. It is contemplated that changes and modifications may be made by one of ordinary skill in the art, to the materials and arrangements of elements of the present invention without departing from the scope of the invention.

We claim:

1. A method for generating a graphical user interface (GUI) of a device, the GUI having an appearance that is designed for different lighting conditions under which the device is viewed, said method comprising:
    providing first and second GUI elements, for display in a single display area of the GUI, the display appearances of which, for viewing under a plurality of different lighting conditions, are each defined by values of a color appearance parameter and at least another different parameter, wherein the value of each parameter for each GUI element defines a combination of a first setting for the parameter and a second setting for the parameter, wherein the value of the color appearance parameter of each GUI element is defined in terms of a luminance difference between the first and second settings of the color appearance parameter; and
    providing a single adjustable control for modifying the display appearances of the first and second GUI elements, contemporaneously with the adjustment of the control, by modifying the combination of the first and second settings for each of the parameters of each of the GUI elements as the control is adjusted, wherein modifying the color appearance of a particular GUI element comprises modifying the luminance value between the first and second settings for the GUI element, wherein the parameters of the first GUI element are modified differently than the parameters of the second GUI element.

2. The method of claim 1, wherein modifying the display appearances of the first and second GUI elements comprises:
    performing a first operation for modifying the combination of the first and second settings for each of the parameters of the first GUI element, wherein said first operation is based on a setting value specified by the control to determine the display appearance of the first GUI element; and
    performing a second operation for modifying the combination of the first and second settings for each of the parameters of the second GUI element, wherein said second operation is based on the setting value to determine the display appearance of the second GUI element, wherein said second operation is different from said first operation, wherein said first and second operations are performed contemporaneously with the control being adjusted.

3. The method of claim 2, wherein said first and second operations comprise at least one of a linear interpolation and a table look-up.

4. The method of claim 1, wherein said first and second GUI elements are at least one of a flat single colored area, a textured area, a text, and an icon of said GUI.

5. The method of claim 1, wherein the control is one of an adjustable dial knob and an adjustable slider.

6. A method for displaying a graphical user interface (GUI) that has an appearance that is designed for different lighting conditions under which the GUI is viewed, the method comprising:
    displaying first and second GUI elements in a single display area of the GUI, each GUI element having a plurality of display color appearances that are defined for viewing under a plurality of different lighting conditions, the display color appearance of each of the GUI elements defined as a combination of two or more different colors, wherein the two or more different colors for the first GUI element are different than the two or more different colors for the second GUI element;
    receiving a selection of a particular setting value from a plurality of values through a movement of a single adjustable control for adjusting the display color appearance of the first GUI element and the display color appearance of the second GUI element for different lighting conditions under which the GUI is viewed, said particular setting value associated with a particular lighting condition; and
    as the particular setting value is received, changing the display color appearance of the first and second GUI elements by modifying the combination of the two or more different colors for the first GUI element and the combination of the two or more different colors for the second GUI element based on the particular setting value, wherein the display color appearance of the first GUI element is changed differently than the display color appearance of the second GUI element in order to provide a presentation of the GUI that is defined for the particular lighting condition.

7. The method of claim 6, wherein the display color appearance of each of the GUI elements is expressed in terms of a combination of a plurality of primary color components, wherein changing the display color appearance of the first and second GUI elements by modifying the combination of the two or more different colors for a particular GUI element comprises modifying the combination of primary color components for the particular GUI element.

8. A method of specifying a graphical user interface (GUI) of a device, the method comprising:
    providing first and second GUI elements, for display in a single display area of the GUI, each GUI element being defined by a combination of two or more different textures, wherein the two or more textures for a particular GUI element are combined differently to define a plurality of different display texture appearances for viewing under a plurality of different lighting conditions, wherein the two or more textures of the first GUI element are different than the two or more textures of the second GUI element;
    providing a single control element for specifying a plurality of setting values that each selects a different weighted blend ratio of the textures for the first and second GUI elements, each setting value corresponding to a lighting condition under which the GUI is viewed;
    providing a first operation that, based on the setting value specified by the control element, determines the display texture appearance of the first GUI element by changing the combination of the two or more textures of the first GUI element according to the selected weighted blend ratio; and providing a second operation that, based on the setting value specified by the control element, determines the display texture appearance of the second GUI element by changing the combination of the two or more textures for the second GUI element according to the selected weighted blend ratio, wherein said second operation is different from said first operation.

9. The method of claim 8, wherein the weighted blend ratio specified by the control specifies an amount of each of the combination of textures used to generate the display texture appearance for each of the GUI elements.

10. The method of claim 8, wherein a first setting value is associated with a first lighting condition and a second setting value is associated with a second different lighting condition.

11. A method for modifying the display appearance of a graphical user interface (GUI), the method comprising:
   displaying first and second GUI elements in a single display area of the GUI, each GUI element having a display appearance defined by values of at least two different parameters, wherein the value of each of the two different parameters for a particular GUI element defines a combination of a first setting for the parameter and a second setting for the parameter;
   providing a single adjustable control for specifying different values for the parameters in order to define different display appearances for the first and second GUI elements for different lighting conditions under which the GUI is viewed;
   receiving an adjustment of the control from a first position to a second position in order to specify new values for the parameters; and
   contemporaneous with the adjustment of the control, modifying the display appearances of the first and second GUI elements by modifying the combination of the first and second settings for each of the parameters of each of the first and second GUI elements, wherein the parameters of the first GUI element are modified differently than the parameters of the second GUI element.

12. The method of claim 11, wherein the first position of said control is associated with a different lighting condition than the particular lighting condition associated with the second position under which the GUI is viewed.

13. The method of claim 11, wherein modifying the combination of the first and second settings for each of the parameters comprises adjusting color shadings of the first GUI element and adjusting different color shadings of the second GUI element.

14. A method for modifying display appearances in a user interface (UI) of a media editing application, the UI comprising at least two UI elements, the method comprising sets of instructions for:
   displaying, in a single display area of the UI, the UI elements of the media editing application with initial display appearances associated with a default value set by the media editing application;
   displaying a single adjustable control of the media editing application for specifying different values associated with different display appearances for each of the first and second UI elements, wherein the different display appearances of the UI elements are designed for viewing under the different lighting conditions in which the device may operate;
   receiving an adjustment of said single adjustable control from a first position to a second position, said second position specifying a particular value different from the default value and associated with a particular lighting condition under which the device operates; and
   based on the particular value, modifying a particular parameter that defines the display appearances of the two UI elements, the modification to the particular parameter different for the first UI element and the second UI element, in order to generate a display of the UI that is particularly designed for the particular lighting condition, the modifications to the first and second UI elements occurring as the single control is adjusted.

15. The method of claim 14 further comprising displaying the UI elements in the single UI display area according to the modifications.

16. A method of defining a graphical user interface (GUI) of a device, the GUI comprising an appearance that is designed for different lighting conditions under which the GUI is viewed, the method comprising:
   defining a first GUI element, for display in a single display area of the GUI, with a plurality of different appearances that are specified for different lighting conditions under which the GUI is viewed;
   defining a second GUI element, for display in the single display area of the GUI, with a plurality of different appearances that are specified for different lighting conditions under which the GUI is viewed;
   defining a single adjustable control for specifying a plurality of values along a continuum of setting values for adjusting the display appearances of the first and second GUI elements for different lighting conditions under which the GUI is viewed, said continuum of setting values comprising a trigger value;
   defining a first operation for specifying the appearance of the first GUI element, wherein the first operation dynamically changes the appearance of the first GUI element based on the values specified by the control as the control moves along the continuum during a single movement;
   defining a second operation for specifying the appearance of the second GUI element, wherein the second operation (i) maintains the appearance of the second GUI element as the control moves along the continuum on one side of the trigger value during the single movement and (ii) changes the appearance of the second GUI element as the control moves to the other side of the trigger value during the single movement, wherein said second operation is different than the first operation.

17. A method for modifying display appearances on a graphical user interface (GUI), said method comprising:
   displaying first and second GUI elements in a single display area of the GUI, each GUI element defined by a plurality of different icon display appearances suited for different lighting conditions under which the GUI is viewed;
   displaying a single control element for selecting a position from a first range of positions and a second range of positions that is contiguous with the first range of positions, wherein the different positions specify the icon display appearances of the first and second GUI elements for the different lighting conditions under which the GUI is viewed;
   receiving a movement of the single control element from a first position in the first range to a second position in the second range;

while the single control element moves within the first range, continuously modifying the display appearance of the first GUI element while displaying a static first icon display appearance for the second GUI element;

when the single control element moves from the first range to the second range, modifying the icon display appearance for the second GUI element to a second icon display appearance while continuing to modify the display appearance of the first GUI element; and while the single control element moves within the second range, continuing to continuously modify the display appearance of the first GUI element while displaying the static second icon appearance for the second GUI element.

18. The method of claim 17, wherein each of a first set of positions in the first range specifies setting values for selecting different icon appearances for the first GUI element, wherein each of the first set of positions in the first range specifies setting values that specify to maintain the static first icon display appearance for the second GUI element.

19. The method of claim 18, wherein the different icon appearances specified by the positions in the first range for the first GUI element and the static first icon display appearance specified by the same positions in the first range for the second GUI element are associated with different lighting conditions.

20. The method of claim 6, wherein the display color appearances of the first and second GUI elements by modifying the combination of the two or more different colors for the first and second GUI elements comprises:

performing a first operation that is based on the particular setting value to determine the combination of the two or more different colors for the first GUI element; and performing a second operation that is based on the particular setting value to determine the combination of the two or more different colors for the second GUI element, wherein said second operation is different from said first operation, wherein said first and second operations are performed as the particular setting value is received.

21. The method of claim 14, wherein the UI elements comprise at least one of a flat single colored area, a textured area, a text, and an icon of the UI.

22. The method of claim 16, wherein the trigger value is a first trigger value, wherein the continuum of setting values comprises a plurality of trigger values including said first trigger value.

23. The method of claim 22 further comprising defining a third operation for specifying the appearance of a third GUI element having a plurality of different appearances, wherein the third operation (i) maintains the appearance of the third GUI element as the control moves along the continuum on one side of a second trigger value during the single movement and (ii) changes the appearance of the third GUI element as the control moves to the other side of the second trigger value during the single movement, wherein said third operation is different than the first and second operations.

* * * * *